Feb. 28, 1928.

J. H. SWAN 1,660,586

DUAL THERMOSTAT

Filed March 5, 1927     3 Sheets-Sheet 1

Inventor:
John H. Swan.
By Rummler & Rummler,
att'ys

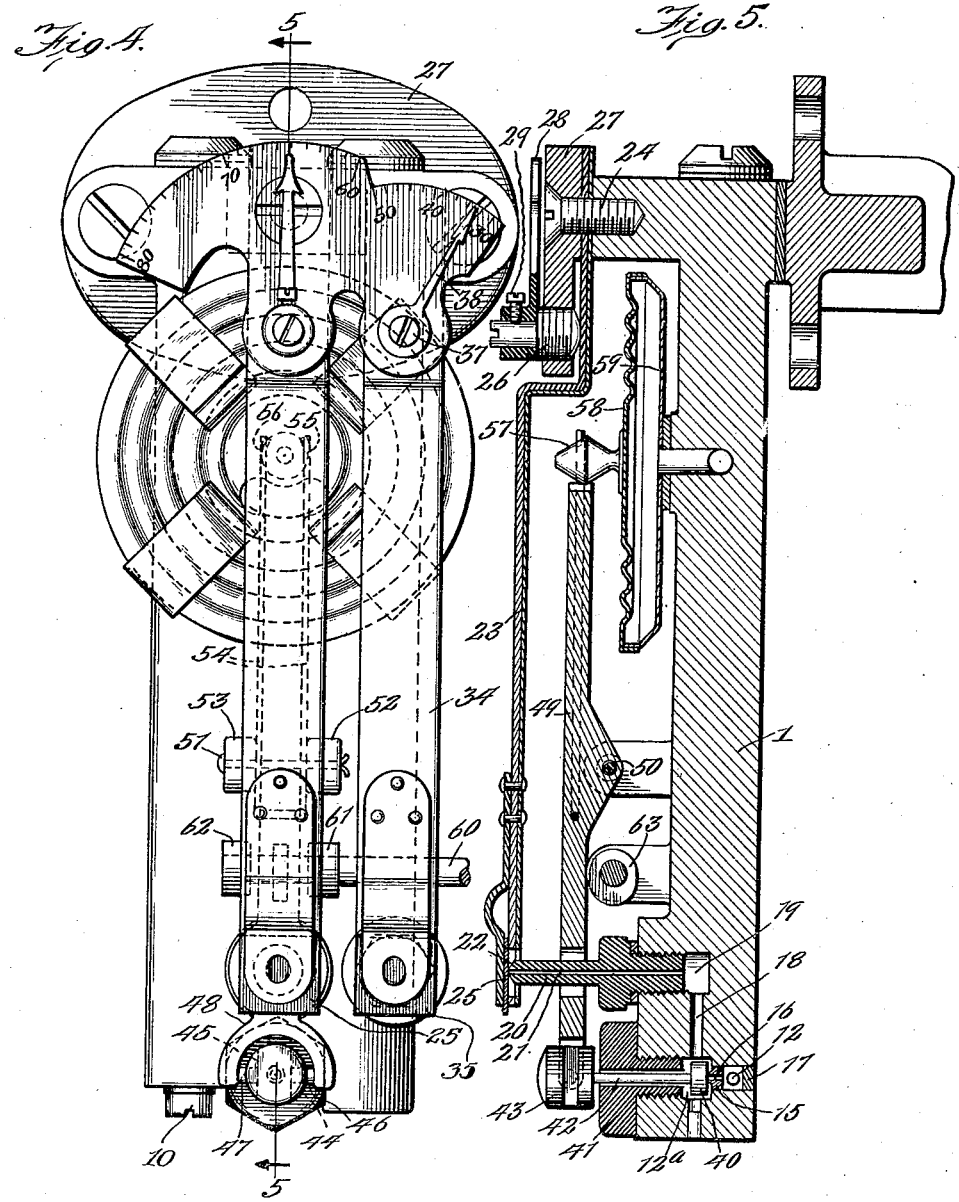

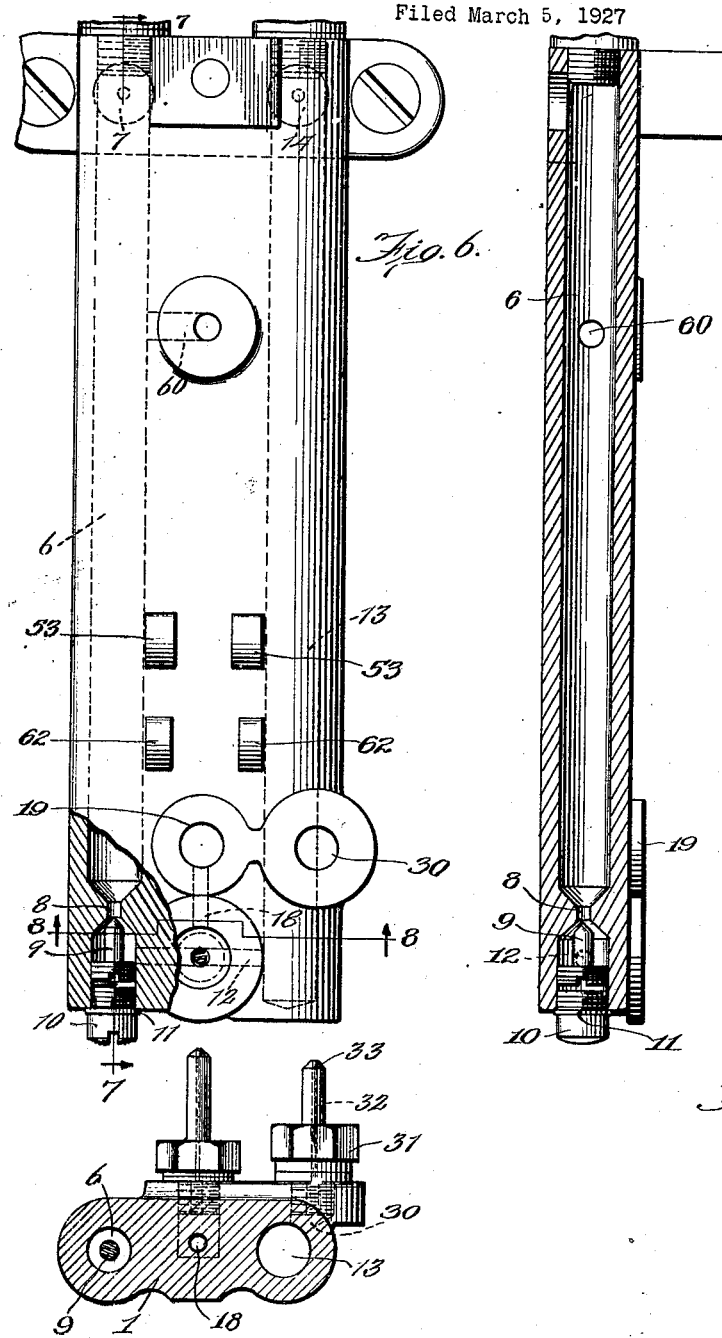

Patented Feb. 28, 1928.

1,660,586

UNITED STATES PATENT OFFICE.

JOHN H. SWAN, OF CHICAGO, ILLINOIS.

DUAL THERMOSTAT.

Application filed March 5, 1927. Serial No. 173,052.

This invention relates to thermostatic valve mechanisms for controlling the operation of distant valves in heating systems wherein it is desired to maintain a certain temperature during the daytime and a different temperature at night.

The main objects of this invention are to provide an improved form of thermostatic valve mechanism which is automatically controlled by different predetermined pressures for operating at different predetermined temperatures and to provide, in such a mechanism, manually operable means for nullifying the effect of the change in the operating pressure.

An illustrative embodiment of this invention is shown in the accompanying drawings, in which:—

Fig. 4 is an enlarged front elevation of the instrument with the cover and base removed.

Fig. 5 is a section taken on the line 5—5 of Fig. 4.

Fig. 6 is an enlarged view of the main casting of the instrument, showing the different bores therein in dotted outline.

Fig. 7 is a section taken on the line 7—7 of Fig. 6.

Fig. 8 is a section taken on the line 8—8 of Fig. 6.

Figures 1, 2, 3:
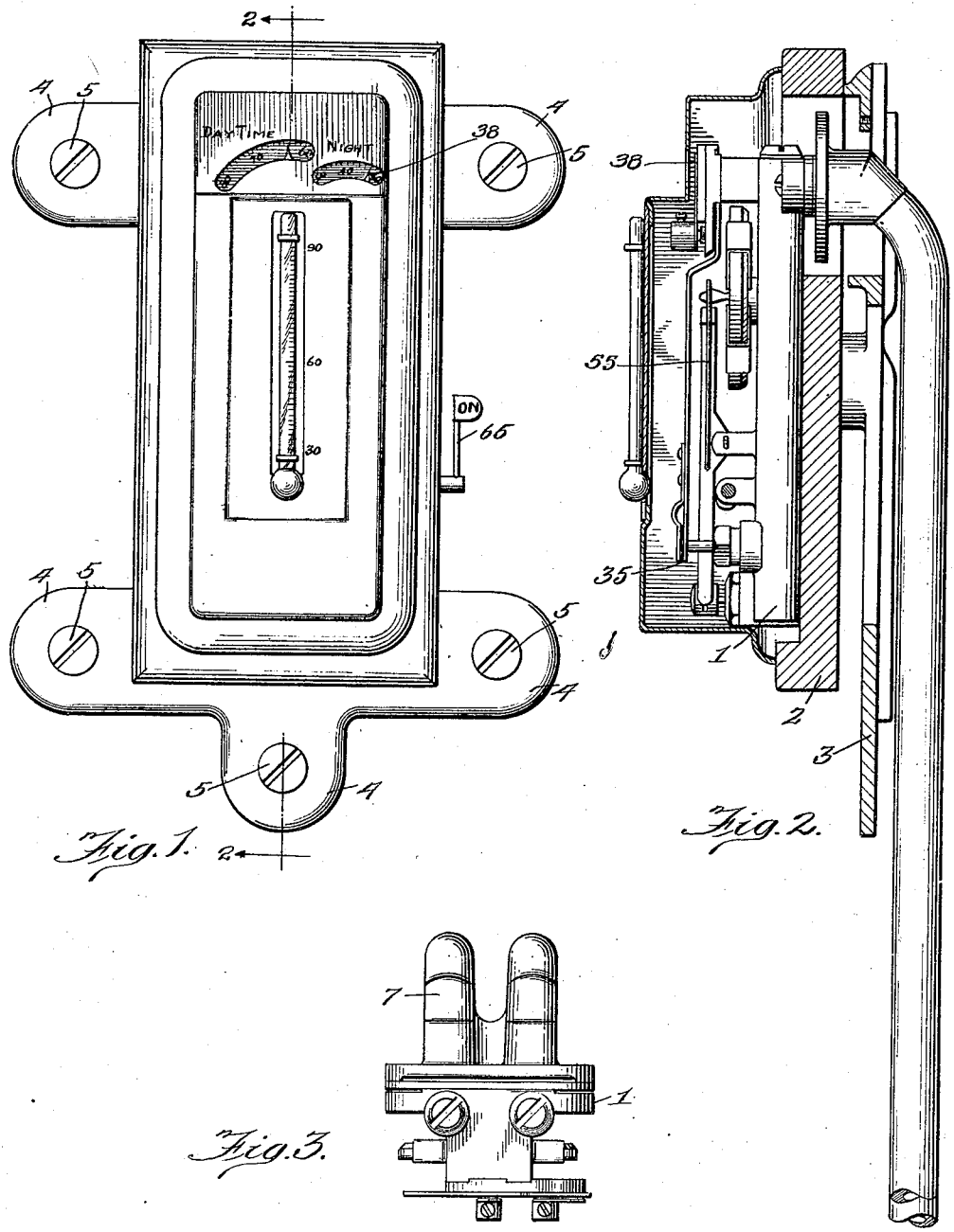
Fig. 1 is a front elevation of the improved form of instrument.
Fig. 2 is a side elevation of the same with the base plate and cover in section in order to show the operating mechanism beneath the cover.
Fig. 3 is an end elevation of the instrument without the base plate upon which it is mounted.

In temperature regulating systems of the pressure operated type, such as the kind to which the present invention is directed, the indicating instruments for maintaining a certain temperature in a particular room are placed in such rooms. These instruments in turn regulate the steam or other heating medium supplied to the radiators by retaining or releasing certain predetermined pressures in a pressure line. These various pressure lines all communicate with a unitary source of supply usually located in the boiler room under the supervision of the engineer.

This invention permits the engineer to maintain certain daytime temperatures in the rooms by keeping a certain predetermined pressure in the pressure lines, usually such temperatures as from 60° to 80° during the daytime. At night, however, it is desirable to reduce the temperature in the rooms and this may be done from one central control by the engineer reducing the pressure in the pressure lines to a certain predetermined lower point. This reduction in pressure actuates the individual instruments in the various rooms whereby the automatically controlled thermostat functions to maintain the lower night temperature of from 30° to 50° for night time operation. This is done by providing a pressure actuated valve which permits the fluid in the pressure line to flow to the daytime thermostatically controlled bleeder valve, but when the pressure in the pressure line is reduced, the pressure operated valve will prevent the fluid in the pressure line from flowing to the daytime bleeder valve. Such lower predetermined pressure will be maintained in the pressure line until the temperature has been reduced to a certain predetermined degree for night operation, at which time a second thermostatically controlled bleeder port is opened which reduces the pressure in the pressure line. In this manner the valve is operated which controls the flow of steam or the like to the radiators.

In some instances, however, it is desired to maintain a relatively high or daytime temperature in some particular room during the night when the system is on low pressure. The instrument is therefore provided with manually operable means for nullifying the effect of the lowered pressure in the pressure line whereby the daytime thermostatically controlled bleeder valve is opened at the usual daytime temperature, and the radiator valve operated accordingly.

In the construction shown in the drawings, a frame 1, preferably of cast brass, is mounted on a wooden base 2, which in turn is attached to a metal spider 3, provided with a series of lugs 4, suitably drilled so that it can be secured to the wall of a room by the screws 5.

The frame 1 is provided with a passageway 6, having an inlet 7, which is adapted to be attached to and communicate with a source of fluid under pressure, as is customary in this type of thermostatic control. The normal daytime operating pressure is ordinarily maintained at fifteen pounds pressure to the square inch.

The end of the passageway 6, opposite to the inlet 7, is of reduced size and is provided with a tapered valve seat 8, which coacts with an adjustable needle valve 9 for providing a restricted orifice for the passage of fluid, the end of the passageway being closed by a set screw 10 threaded thereinto, and having a gasket 11 beneath the head thereof for securing a tight seal.

The frame is bored transversely to the passageway 6 to provide a passageway 12, which extends across the lower end of the frame 1, and communicates with a passageway 13 bored along the opposite side of the frame to the passageway 6, and substantially parallel thereto. The passageway 13 is provided with an outlet 14, which is attached to and communicates with the pressure operated diaphragm valve of the radiator (of the kind commonly used with this type of pressure regulated heating system).

The frame is bored at right angles to the passageways 6, 12 and 13 at a point substantially midway between the passageways 6 and 13, so as to communicate with the passageway 12, as shown in Fig. 5. The bore is preferably of two different diameters, and a plug 15 is secured in this passageway immediately adjacent the larger portion thereof, which has a small opening 16 therethrough. The upper face of the plug is cone-shaped about the passageway 16 to provide a valve seat. The lower end of the passageway below the passageway 12 is closed by a soft plug 17.

Another passageway 18 is bored in the framework, one end of which communicates with the passageway 12$^A$ at right angles thereto and substantially parallel to the passageways 6 and 13. Its other end communicates with a bore 19, which is provided in the frame substantially parallel to the bore 12$^A$. The bore 19 is threaded and provided with a fitting 20 screwed thereinto, commonly known as a bleeder. This fitting is provided with a small axial passageway 21, which terminates at its outer end in a conical shaped valve seat 22. The passage of fluid out of this bleeder 20 is controlled by a bimetallic thermostatic bar 23, rigidly mounted at one end on the frame 1 by a set screw 24, and carries a valve 25 on its other end. This valve is preferably a thin disk of bakelite or other such material. Adjustment of the thermostatic bar 23 is provided by a set screw 26, threaded in a plate 27, which rests on the upper end of the thermostatic bar 23, and to which it is secured by the set screw 24. The set screw 26 is provided with an indicating hand 28 secured thereto by a set screw 29, and the plate 27 is sector shaped, preferably graduated from sixty to eighty degrees, as clearly shown in Fig. 4.

The thermostatic bar 23 is used for daytime control, and is adjusted to operate in such a manner that it will open the bleed port 21 of the bleeder 20, thereby permitting escape of the fluid therein when the temperature falls below the usual desired daytime temperature indicated by the hand 28.

The frame 1 is also provided with a passageway 30, communicating with the passageway 13 which is threaded in the same manner as the passageway 19. In a like manner, the passageway 30 is provided with a bleeder 31, having a bleed port 32 therein, the upper end of which is cone-shaped, as shown at 33, to provide a valve seat. Escape of the fluid under pressure is controlled at this bleed port by a second bimetallic thermostatic bar 34, mounted on the frame 1 in the same manner as the bar 23 and to which it is securely held at one end as by the plate 27. Its other end is provided with a valve 35 of the same material as the valve 25.

Adjustment of the bar 34 is provided by a set screw 37, threaded in plate 27, the inner end of which bears against the bar. Its outer end is provided with an indicating hand 38, and its movement across an appropriate scale, preferably marked from thirty to fifty degrees, adjusts the tension on the bar 34 which raises the valve 35 from its valve seat on the end of the bleeder 31 according to the temperature indicated on the scale.

Means are provided for controlling the passage of fluid under pressure to the bleeder port 21, which comprises a three-way valve 40. This valve is located in the passageway 12$^A$ and is retained therein by a fitting 41, threaded into the passageway. This fitting 41 is drilled axially to slidably and loosely receive a valve stem 42 of the valve 40 which is mounted on one end thereof. An enlarged head 43 is mounted on the outer end of the stem 42.

The head 43 is provided with slots 44 and 45 on its diametrically opposite sides. These slots are arranged to receive inwardly projecting pins or studs 46 and 47 respectively of a yoke 48, which is mounted on one extremity of a bar 49. This yoke is pivotally mounted at 50 by a cotter pin 51, which passes through the bar, and which is supported on a pair of spaced upstanding lugs 52 and 53, cast integral with the frame 1.

The end of the bar 49, opposite to yoke 48, is provided with an elongated U-shaped spring wire 54. Its ends form a pair of arms 55 and 56, which yieldingly embrace the exterior surfaces of a double ended cone-shaped turning 57 that is mounted on the corrugated disk-shaped diaphragm 58 of a pressure motor 59.

Communication between the interior of the pressure motor 59 and the passage 6 in frame 1 is provided by a lateral branch passageway 60. This permits the fluid under pressure from the passageway 6 to enter the pressure motor 59 and bulge out the corrugated face thereof sufficient to permit the spring arms 55 and 56 to pass over the medial portion of the cone. The spring tension of the arms then carries the arm inwardly toward the pressure motor, thereby rocking it on its pivot 50 and lifting the valve 40 from its seat so that in normal daytime operation of the instrument, fluid from the system is permitted to pass to the bleeder port 21.

For night time operation of the system, a lesser pressure (preferably thirteen pounds) is maintained in the lines. Such pressure is insufficient to maintain the pressure motor 59 in its expanded position. When the pressure is thus reduced, the diaphragm 58 moves inwardly, or to the right, as viewed in Fig. 5, and the spring arms 55 and 56 pass beyond the medial portion of the cone 57 and ride down the outer faces thereof. The arm 49 is thus shifted and closes valve 40.

When the temperature in the room drops to the point corresponding with the setting of the hand 38, which adjusts the night time thermostatic bar 34, the valve 35 will be lifted from its bleeder port and permit the escape of fluid. This escape reduces the pressure in the diaphragm motor which controls the valve on the radiator.

It is desirable at times, however, to maintain the daytime temperature in certain individual rooms during the night time operation of the system. Manually operated means therefore provided for lifting and maintaining the valve 40 from its seat, which comprise a rod 60, rotatably journaled on a pair of upstanding lugs 61 and 62 cast integral with the frame 1, which carries a cam 63, rigidly mounted thereon directly beneath the bar 49. When the cam 63 is in a position, as shown in Fig. 5, the bar is free to rock on its pivot. When the cam is rotated to the right, as viewed in Fig. 5, ninety degrees from this position, the rotation being manually accomplished by an arm 65 mounted on the exteriorly projecting end of rod 60, the cam bears against the under side of the bar 49 and pushes the bar to the left, as viewed in Fig. 5, thereby lifting the valve 40 from its seat.

In the operation of the device, the daytime temperature desired is fixed by moving the hand 28 across its scale to the desired point. The normal pressure of fifteen pounds per square inch is thus maintained in the system. This normal pressure operates the pressure motor 59, whose diaphragm 58 bulges outwardly sufficient to cause the spring arms 55 and 56 to pass over the center of cone 57 and to slide down the inner walls thereof. The valve 40 is thereby lifted from its seat, permitting the flow of fluid under pressure in the system to the bleeder port 21.

When the temperature in the room drops below the point indicated by the hand 28 on the scale, the bimetallic thermostatic bar 23 lifts the valve 25 from the end of the bleeder 20, and permits the escape of the fluid. This escape of fluid reduces the pressure in the line between the instrument and the pressure operated diaphragm valve on the radiator. The radiator valve then opens and permits the heating medium to pass into the radiator, but upon the room regaining the temperature desired, the thermostatic bar 23 will again close the bleeder port 21. Pressure in the lines between the instrument and the radiator valve is thereby built up and the radiator valve is thereby closed.

When it is desired to maintain a low temperature in the rooms, as, for instance, during the night, the pressure in the entire system is reduced from fifteen to thirteen pounds. This reduction in pressure causes the pressure motor 59 to collapse, thereby rocking bar 49 in the opposite direction and closing valve 40 on its seat. In this manner the flow of fluid from the pressure lines to the bleeder port 21 is cut off.

As the temperature in the room drops below the point indicated by the hand 28, the valve 25 raises from its seat, but escapement of pressure in the system is not permitted, due to the valve 40. It is not until the temperature falls to the point indicated by hand 38 that the bimetallic thermostat bar 34 raises the valve 35 carried thereby from its bleeder port 32, and when this occurs, the pressure in the lines between the instrument and the radiator valve is reduced in the same manner as during daytime operation. The radiator valve is thus permitted to open so that the heating medium may pass thereinto and maintain a temperature in the room as indicated by the hand 38 on its scale.

In some instances it is desirable to have certain particular rooms of the system maintained at a high or daytime temperature while the entire system is operated on a low temperature basis. When such course is desired, the occupant of the particular room in question moves the handle 65 from a horizontal to a vertical position, as shown in Fig. 1 of the drawings. The cam 63 is thus rocked underneath the lower end of the bar 49, and in this manner the valve 40 is lifted from its seat. When the temperature in the room lowers to a point indicated by the hand 28, the bleeder port 21 will be opened to permit the escape of fluid between the instrument and the radiator valve, causing the radiator valve to admit heating fluid to the radiator in the same manner it is admitted during the daytime operation of the system.

When the bleeder port 21 is opened during the daytime operation of the instrument, the pressure is lowered only in that part of the system between the instrument and the radiator valve, due to the adjustment of the needle valve 9. This needle valve is so positioned with respect to its valve seat 8 that a pressure is maintained in the passageway 6 at all times sufficient to maintain the pressure motor 59 in its expanded position. In this position, the motor cannot rock the arm 49, and thereby close the valve 40 on its seat when the bleeder port 21 is opened by its thermostatic bar 23.

Although but one specific embodiment of this invention has been herein shown and described, it will be understood that numerous details of the construction shown may be altered or omitted without departing from the spirit of this invention as defined by the following claims.

I claim:

1. A thermostatic valve mechanism comprising a frame having a passageway therein with an inlet for attachment to a source of fluid under pressure and an outlet for attachment to a pressure operated mechanism, said frame having a pair of bleeder ports communicating with said passageway, a pair of thermostatically operated valves for controlling said bleeder ports, and a pressure operated valve for controlling the passage of fluid to one of said bleeder ports.

2. A thermostatic valve mechanism comprising a frame having a passageway therein with an inlet for attachment to a source of fluid under pressure and an outlet for attachment to a pressure operated mechanism, said frame having a pair of bleeder ports communicating with said passageway, a pair of thermostatically operated valves for controlling said bleeder ports, a pressure operated valve for controlling the passage of fluid to one of said bleeder ports, and means for rendering said pressure operated valve inoperable.

3. A thermostatic valve mechanism comprising a frame having a passageway therein with an inlet for attachment to a source of fluid under pressure and an outlet for attachment to a pressure operated mechanism, said frame having a pair of bleeder ports communicating with said passageway, a pair of thermostatically operated valves for controlling said bleeder ports, a pressure operated valve for controlling the passage of fluid to one of said bleeder ports, and manually operable means for rendering said pressure operated valve inoperable.

4. A thermostatic valve mechanism comprising a frame having a passageway therein with an inlet for attachment to a source of fluid under pressure and an outlet for attachment to a pressure operated mechanism, said frame having a pair of bleeder ports communicating with said passageway, a pair of thermostatically operated valves for controlling said bleeder ports, said valves being arranged to open their respective bleeder ports at relatively different predetermined temperatures, and a pressure operated valve for controlling the passage of fluid to the bleeder valve which opens at the high temperature.

Signed at Chicago this 28th day of February 1927.

JOHN H. SWAN.